(12) United States Patent
Anthe, II et al.

(10) Patent No.: US 7,788,495 B2
(45) Date of Patent: Aug. 31, 2010

(54) SYSTEMS AND METHODS FOR AUTOMATED CONFIGURATION OF SECURE WEB SITE PUBLISHING

(75) Inventors: Charles John Anthe, II, Seattle, WA (US); Huseyin Gokmen Gok, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2118 days.

(21) Appl. No.: 10/453,154

(22) Filed: Jun. 3, 2003

(65) Prior Publication Data

US 2004/0250075 A1 Dec. 9, 2004

(51) Int. Cl.
*H04L 29/06* (2006.01)
(52) U.S. Cl. ......................... 713/175; 726/10
(58) Field of Classification Search ................ 726/10, 726/12; 713/175
See application file for complete search history.

(56) References Cited

U.S. PATENT DOCUMENTS

| | | | |
|---|---|---|---|
| 5,666,416 A * | 9/1997 | Micali | 713/158 |
| 6,108,789 A * | 8/2000 | Dancs et al. | 726/9 |
| 6,134,658 A | 10/2000 | Multerer et al. | |
| 6,233,341 B1 * | 5/2001 | Riggins | 380/277 |
| 6,311,270 B1 | 10/2001 | Challener et al. | |
| 6,430,688 B1 | 8/2002 | Kohl et al. | |
| 6,539,093 B1 | 3/2003 | Asad et al. | |
| 6,567,918 B1 | 5/2003 | Flynn et al. | |
| 6,571,254 B1 | 5/2003 | Kido et al. | |
| 6,816,900 B1 * | 11/2004 | Vogel et al. | 709/225 |
| 6,934,859 B2 * | 8/2005 | Aull | 726/2 |
| 7,024,474 B2 * | 4/2006 | Clubb et al. | 709/223 |
| 2002/0138771 A1 | 9/2002 | Dutta | |

OTHER PUBLICATIONS

Martin, Franck "SSL Certificates HOWTO" Oct. 20, 2002.*

\* cited by examiner

*Primary Examiner*—Gilberto Barron, Jr.
*Assistant Examiner*—Devin Almeida
(74) *Attorney, Agent, or Firm*—Workman Nydegger

(57) ABSTRACT

The present invention provides systems and methods to automatically install and trust a self-signed (e.g., untrusted) web site certificate on one or more web clients local to the network. In addition, the systems and methods provide for automatic installation of the self-signed certificate and/or a signed (e.g., trusted) certificate on a web server, and automatic configuration to enable an authentication and/or encryption mechanism (e.g., SSL encryption) with at least a portion of the web site. Conventionally, certificate installation, configuration and trusting are achieved manually, which can be time consuming and prone to errors such as trusting a fictitious certificate, for example. The systems and methods of the present invention provide a novel approach to mitigate manual web site certificate installation (e.g., trusted and untrusted) and trusting, web client interruption via untrusted web site warning notifications, and domain web site redirection to a fictitious web site.

53 Claims, 9 Drawing Sheets

SYSTEMS AND METHODS FOR AUTOMATED CONFIGURATION OF SECURE WEB SITE PUBLISHING

TECHNICAL FIELD

The present invention generally relates to web site certificates, and more particularly to systems and methods to automatically install and trust a self-signed web site certificate within a domain.

BACKGROUND OF THE INVENTION

Networking technologies provide a fast, efficient and cost effective means to exchange information from practically anywhere in the world. For example, a Wide Area Network (WAN) can be employed to interface a client residing in one continent with a client and/or server residing in another continent. In many instances, the interaction can include a user employing a web browser from a client to access a web site residing on a web server via the Internet. Typically, the web browser provides a graphical user interface (GUI) to present information to the user. In addition, the interface provides the user with a means to input information, or interact with the web application.

Web based interaction is commonly exploited by corporations, medical facilities, businesses, the government, industry, and educational facilities to simplifier and enhance everyday tasks such as correspondence (e.g., via email, instant messaging and chat rooms), documentation, problem solving, mathematical computation, scheduling, planning, and information gathering, for example. Commonly, personal and confidential information is transmitted. For example, a consumer purchasing items over the Internet may be required to provide a credit card number, a name, and an address to a web application through a web interface. In another example, medical records that include information such as medical diagnoses, social security number and mental capacity, for example, can be conveyed over the Internet. For example, a physician employing a web client from home can view a patient's record and/or associated images (e.g., computed tomography (CT) images) via accessing the hospital's information repository through the a web site residing on the hospital's web server.

Information conveyed over a network is susceptible to interception (e.g., eavesdropping) and tampering if the information is transmitted in an unsecure (e.g., unencrypted) manner. For example, confidential information such as credit card numbers, bank account numbers and social security numbers transmitted over an unsecure channel can be viewed and/or copied by malicious parties intending to commit criminal activity and fraud. For example, a malicious party can intercept a credit card number, and then employ the credit card number to unlawfully purchase goods. The credit card holder then incurs the burden of canceling the credit card, securing credit with another credit card company, protecting their credit history, and seeking relief for the illegal purchases. A consumer experiencing the foregoing can be inclined to avoid employing web-based means when engaging in subsequent purchases. Even the potential for the foregoing can prejudice a user from purchasing and communicating via the web.

In response to security concerns and the increased reliance on web technology in the exchange of information over, research, development and implementation efforts have ensued to provide web security mechanisms. For example, authenticating technologies such as Secure Sockets Layer (SSL) encryption have been developed, and are typically employed and associated with web site to determine whether a website is valid (e.g., trusted). Such technologies can verify a web site via ensuring the website is associated with a valid (e.g., signed) web site certificate. Generally, the web site certificate can provide web site identification such as the web site's publisher, and can be employed to match a web site publisher with the certificate. When a match is successful, the web client is typically provided access to the web site. However, when a match is unsuccessful, the web client is commonly provided with a notification indicating that the web site is untrusted.

Currently, publishing a web site on the Internet and employing SSL encryption can comprise several manual steps that can be time consuming and expensive. For example, configuring a web site to employ SSL encryption typically includes purchasing a certificate from a third party or generating a self-signed certificate, manually installing and manually configuring the certificate on the web server, manually installing and manually configuring the certificate on the web client, and manually trusting the certificate on the web clients local to the server domain.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that automatically install a self-signed web site certificate to a web server and associated domain web clients, and automatically trusts the certificate on the domain web clients. In general, web site certificates can provide a mechanism to ensure that a web site is valid. For example, a web publisher can obtain and install a web site certificate in connection with publishing a web site on a web server. A web browser can then scrutinize the web certificate when accessing a web site to validate the integrity of the web site. If the web site certificate is untrusted, the web client is typically provided with a notification that indicates the web site is untrusted, and the web client can manually trust the web site or decide not to access the untrusted web site. If the web site certificate is trusted (e.g., signed), then access is provided without any untrusted web site notification.

In many instances, the web publisher generates and/or obtains a self-signed web site certificate, which is typically untrusted. The self-signed web site certificate can then be manually installed on the web server and manually trusted on web clients. Manually trusting the self-signed certificate on a web client commonly occurs when the web client encounters the untrusted web certificate when attempting to access the web site associated with the web certificate.

The systems and methods of the present invention provide a novel approach to mitigate manual web site certificate installation (e.g., trusted and untrusted) on a web server, manual trusting of self-signed web site certificates on local domain web clients, and web client interruption via untrusted web site warning notifications. In addition, the present invention provides a novel technique to mitigate web site redirection to a fictitious web site.

In one aspect of the present invention, a system comprising an input component and a signature component that facilitates self-signed (e.g., untrusted) web site certificate installation and trusting during web site publishing is provided. The input component can be employed to obtain the self-signed web site certificate for the web site. The signature component can then automatically install the self-signed web site certificate to the web site's server and automatically configure the server to employ an authenticating and/or encrypting mechanism such as Secure Sockets Layer (SSL) encryption. In addition, the signature component can automatically install the self-signed web site certificate to domain web clients, wherein the self-signed web site certificate is automatically trusted. Then, a user can access the web site (e.g., via a web browser) and utilize the web services (e.g., email) associated with the web site without receiving an untrusted certificate warning and/or without having to manually trust the self-signed web site certificate. The foregoing mitigates manually installing, configuring and trusting self-signed web site certificates.

In another aspect of the present invention, the system comprising the input component and the signature component can facilitate signed (e.g., trusted) web site certificate installation. Similarly, the input component can be employed to obtain the signed web site certificate for the web site, and the signature component can then automatically install the signed web site certificate to the web site's server. Conventionally, signed web site certificates are manually installed. Thus, the present invention can provide a more efficient mechanism to install signed web site certificates, which can save time and reduce cost.

In yet another aspect of the present invention, a system comprising a certificate generating component, a certificate loading component, and a certificate authenticating component that can be employed to automatically create, deploy and trust web site certificates is provided. The certificate generating component can be employed to create a self-signed web site certificate when publishing a web site to the Internet. Typically, the self-signed web site certificate comprises one or more common names such as an external domain name, local server name and/or a local host name, which enables a user various mechanism to access and trust a web site. After creating the self-signed certificate, the certificate loading component can automatically install the self-signed website certificate to the web site's server and automatically enable SSL encryption. Optionally, SSL encryption can be configured to selectively employ and/or specifically require SSL in connection with portions of the web site. The certificate authenticating component can then automatically install the self-signed web site certificate to domain web clients such that the self-signed web site certificate is trusted. Then, a web client can access the web site without receiving an untrusted web site notification.

In other aspects of the present invention, systems are provided that employ user interface components (e.g., a GUI and an API) to interact with a web site publisher to facilitate publishing at least a portion of a web site to the Internet. In addition, components are provided to alter an existing certificate (e.g., signed and unsigned) during web site publishing. In still other aspects of the present invention, methodologies are provided to generate and automatically trust self-signed web site certificate, to automatically install third party signed web site certificates, and to mitigate malicious attempts to redirect web clients to a factious web site.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
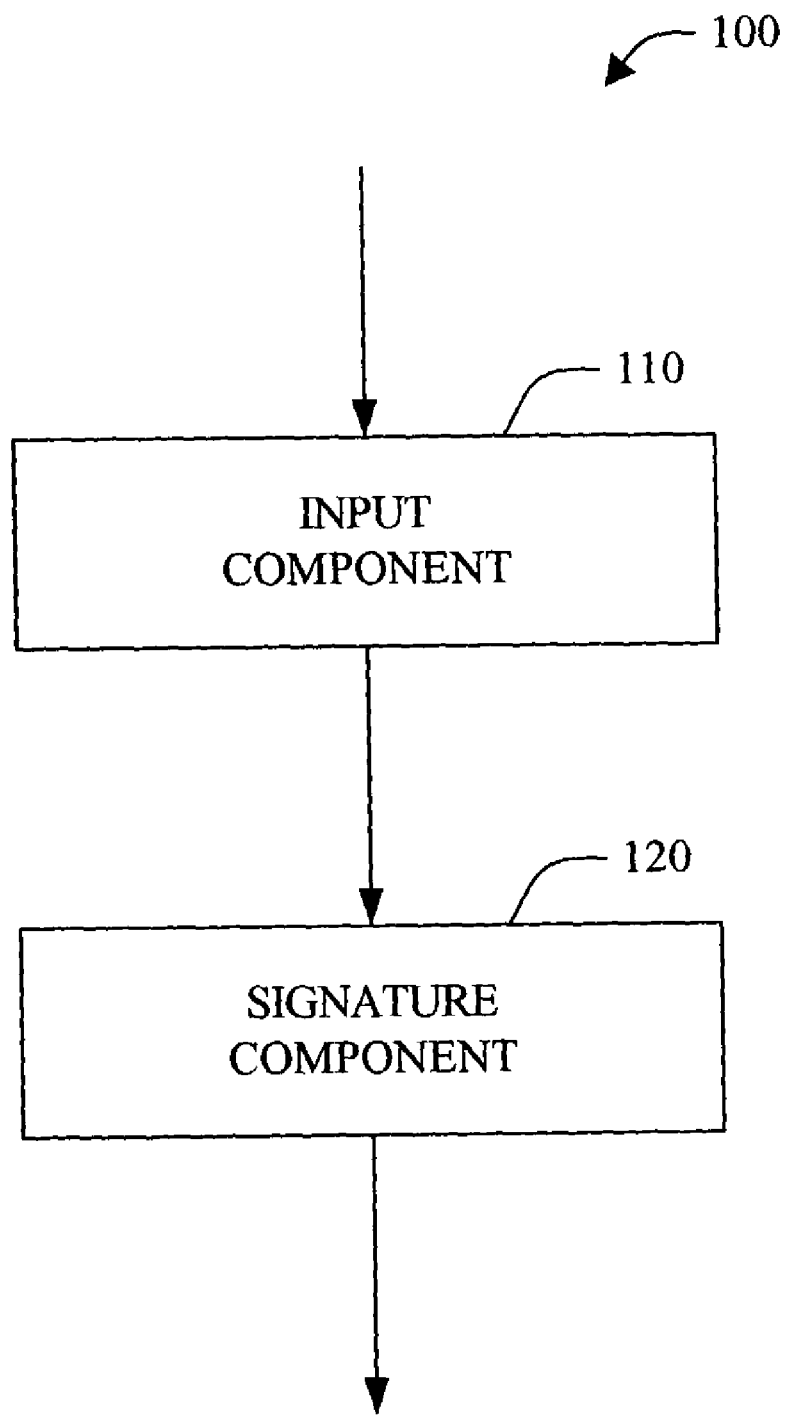
FIG. 1 illustrates an exemplary system that facilitates web site certificate installation and trusting during web site publishing, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention relates to systems and methods to automatically trust self-signed web site certificates installed on web clients within the web site's domain. Conventionally, self-signed web site certificates are manually installed and configured on the web server and web clients, which can consume time and interrupt a user's attempt to access a local web site. The systems and methods of the present invention mitigate manual installation and configuration via automatic installation and trusting. In addition, the present invention can be employed to generate website certificates and automatically install third party signed certificates.

Referring to FIG. 1, a system 100 that facilitates web site certificate ("certificate") installation and trusting during web site publishing in accordance with an aspect of the present invention is illustrated. The system 100 comprises an input component 110 and a signature component 120.

The input component 110 can be employed to obtain a self-signed (e.g., untrusted) certificate, and then convey the self-signed certificate to the signature component 120. For example, the input component 110 can be employed in connection with an interface (e.g., a wizard, an installation shell and an application programmer interface (API)) and/or can include the interface, wherein a web publisher can interact with the interface during web site publishing to provide and/or create a self-signed certificate associated with the web site. Once obtained, the input component 110 can provide the self-signed certificate to the signature component 120 for installation, as described below.

The signature component 120 can then automatically install the self-signed certificate to the web site's server (e.g., an Internet Information Server (IIS)) and automatically configure the server to employ an authentication and/or encryption mechanism (e.g., Secure Sockets Layer (SSL) encryption) in connection with the web site. Conventionally, self-signed certificates are manually installed to the web server and manually configured, which can consume time and resources.

The signature component 120 additionally can automatically install the self-signed certificate to any web client that is local to the web site's domain (e.g., network), and automatically configure the web client(s) to employ the authentication and/or encryption mechanism (e.g., for at least a portion of the web site). In addition, the installation technique can automatically trust the self-signed certificate on the domain web client(s), which can mitigate receiving untrusted web site messages (e.g., pop-up messages and notifications) and having to manually trust the self-signed certificate, as described below.

Conventionally, and as briefly noted above, the self-signed certificate is manually installed on the web server and manually configured to enable encryption. Then, when a web client attempts to access the web site (e.g., via a web browser) associated with the self-signed certificate, a notification indicating that the web site is untrusted is provided to the web client. Typically, the web client is provided with an option to manually trust the self-signed certificate that includes several information and verification steps. For example, the self-signed certificate can be trusted for the current session, until it expires and/or based on web browser security configuration such as providing access to the untrusted web site, wherein a notification is transmitted when information is about to be exchanged.

If the user manually trusts the self-signed web site certificate, the web client can be subsequently provided with access to the web site, wherein the user can utilize the services (e.g., email) provided through the web site. If the user decides not to trust the self-signed certificate on the web client, then, and as long as the self-signed certificate is untrusted, a notification will be provided to the user during subsequent attempts to accesses the web site from the web client.

The present invention mitigates manual installation, configuration and trusting of the self-signed certificate via automatically installing the self-signed certificates to the web server and configuring the web server to employ authentication and/or encryption, and automatically installing, configuring and trusting the self-signed certificate on domain web clients. The foregoing can reduce certificate setup time on the web server and associated cost, and mitigate interrupting domain web clients with untrusted web site certificate notifications and subsequent manual trusting. Thus, the web client on the local network can access the web site associated with the self-signed certificate without receiving a warning (e.g., that the web site is untrusted) and/or without manually trusting the self-signed certificate.

It is to be appreciated that the system 100 can additionally be employed to obtain a signed (e.g., trusted) web site certificate, and convey the signed certificate to the signature component 120 for subsequent installation on the web server. For example, the web site publisher can purchase a signed certificate from a third party (e.g., Verisign). Typically, acquiring the signed web site certificate comprises creating a certificate request, contacting the third party certificate provider, tendering for the signed certificate, and then receiving the signed certificate. Then, the web publisher can provide the signed certificate to the input component 110, which can then convey the signed certificate to the signature component 120. The signature component 120 can then automatically install the signed web site certificate to the web site's server and automatically configure the server to employ an authentication and/or encryption mechanism such as SSL encryption. Thus, the present invention additionally mitigates manual installation and configuration of signed web site certificates on the web server.

Figure 2:
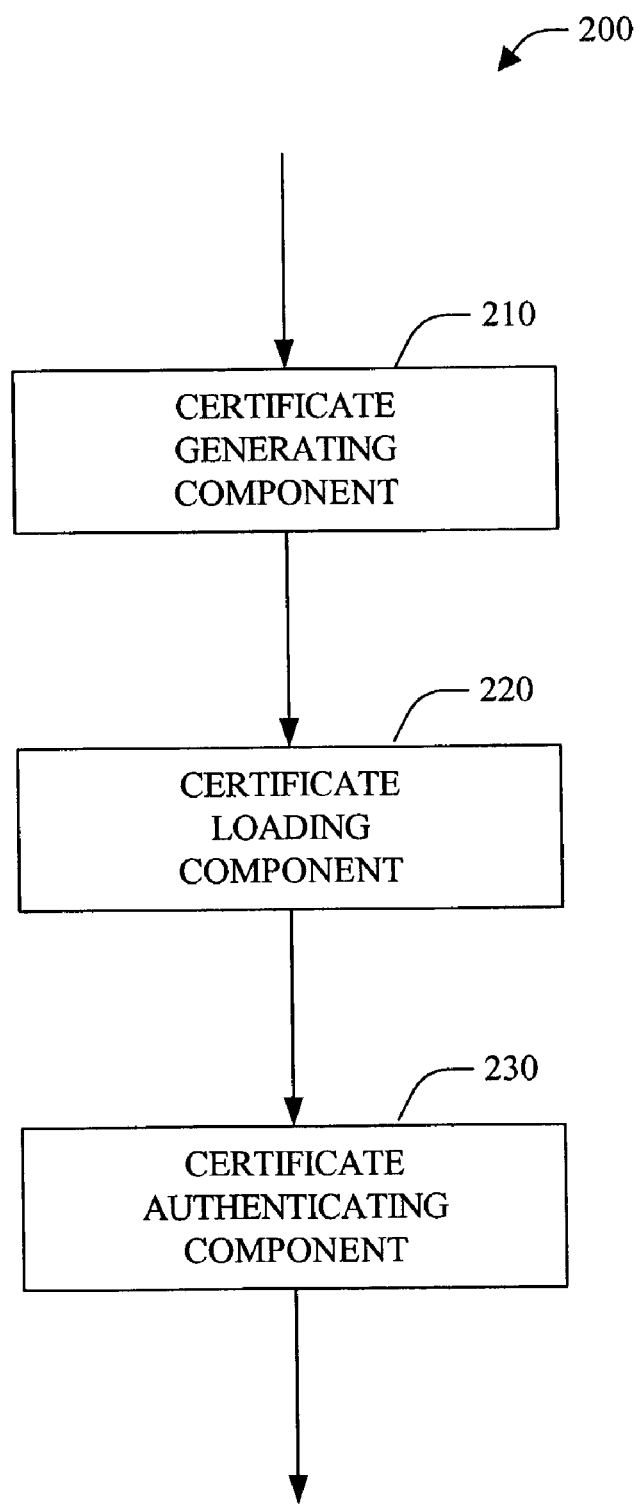
FIG. 2 illustrates an exemplary system that can be employed to automatically create, deploy and trust web site certificates, in accordance with an aspect of the present invention.

Proceeding to FIG. 2, a system 200 that can be employed to automatically create, deploy and trust a web site certificate in accordance with an aspect of the present invention is illustrated. The system 200 comprises a certificate generating component 210, a certificate loading component 220, and a certificate authenticating component 230.

The certificate generating component 210 can be employed (e.g., in connection with an API) to create a self-signed web site certificate. For example, a web publisher can decide to publish at least a portion of a web site to the Internet for access via web browsers. Typically, publishing a web site to the Internet comprises providing a web site certificate associated with the web site such that the validity (e.g., via SSL encryption) of the web site can be confirmed prior to the web browser accessing the web site. In general, the web site certificate can be purchased and/or created via certificate generating tools. Purchasing a web site certificate can be costly and can introduce a delay between requesting and receiving the web site certificate. The certificate generating component 210 provides the web publisher an inexpensive and efficient mechanism to generate the self-signed web site certificate, and mitigate delays from third party vendors.

In one aspect of the present invention, the generating component 210 can create a self-signed web site certificate with a pre-populated server name. In addition, one or more common names can be included. Common names can provide a web browser various mechanisms by which to trust a web site certificate and access the web site. For example, the web browser can access the website via common names such as an external domain name, local server name and/or a local host name.

After creating the self-signed web site certificate, the certificate generating component 210 can convey the self-signed website certificate to the certificate loading component 220 (e.g., the signature component 110). The certificate loading component 220 can then automatically install the self-signed website certificate to the web site's server and automatically enable Secure Sockets Layer (SSL) encryption. Optionally, SSL encryption enablement can be configured to selectively employ and/or specifically require SSL in connection with portions of the web site. Once the self-signed web site certificate is installed on the web server, the web site can be accessed by web clients, for example to utilize the services (e.g., mobile accessing services) provided through the web site. Conventionally, the self-signed web site certificate is manually installed and configured on the web server. The present invention provides a more efficient automated technique.

The certificate authenticating component 230 (e.g., the signature component 110) can then automatically install the self-signed web site certificate to any web client associated with the web server's domain. For example, the self-signed web site certificate can be moved to a trusted root certificate store (e.g., via a secured shard folder) on the domain web client. Then, the domain web client can access the web site without receiving an untrusted web site notification and without having to manually trust the self-signed web site certificate. Conventionally, and noted above, the web client can be manually configured to trust a self-signed web site certificate after attempting to access an untrusted web site. Thus, the present invention can mitigate utilizing a manual technique to install and trust self-signed web site certificates and receiving untrusted web site warnings on domain web clients.

Figure 3:
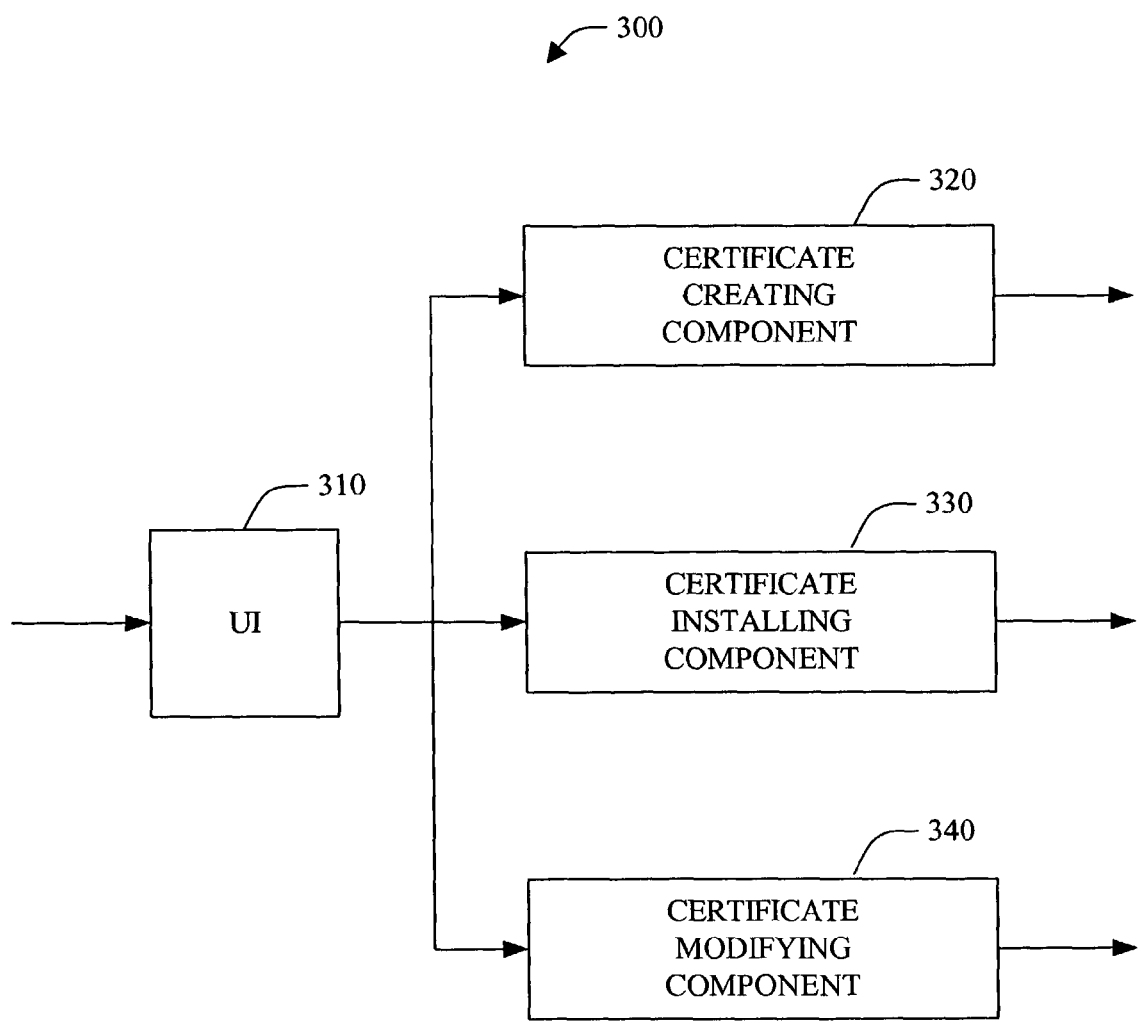
FIG. 3 illustrates an exemplary system that can be employed to facilitate web site publishing, in accordance with an aspect of the present invention is illustrated.

FIG. 3 illustrates an exemplary system 300 that can be employed to facilitate web site publishing in accordance with an aspect of the present invention is illustrated. The system 300 comprises a user interface component (UI) 310, a certificate creating component 320, a certificate installing component 330, and a certificate transforming component 340.

The UI 310 can be employed to obtain a web site certificate and/or a request to create a web site certificate. Then, the UI 310 can convey the request to the certificate generating component 310, convey the certificate to the certificate installing component 320, or convey the request and the certificate to the certificate modifying component 340. For example, the UI 310 can be employed in connection with web site publishing, wherein a web site publisher can utilizes the UI 310 to facilitate publishing at least a portion of a web site to the Internet, for example to provide access to the web site by web site consumers via a web client.

The UI 310 can be a graphical user interface (GUI) or a command line interface, for example. For example, a GUI can be employed to present and obtain information from the web publisher. For example, the GUI can comprise known text and/or graphic presenting regions comprising dialogue boxes, static controls, drop-down-menus, list boxes, pop-up menus, and graphic boxes. The presenting regions can further include utilities to facilitate the presentation. For example, the presenting regions can include vertical and/or horizontal scroll bars to facilitate navigation through the foregoing and toolbar buttons to determine whether a region will be viewable. The web publisher can interact with the presenting regions to select and provide information via various devices such as a mouse, a roller ball, a keypad, a keyboard, a pen and/or voice activation, for example.

Input regions utilized to obtain information can employ similar mechanism (e.g., dialogue boxes, etc.), and in addition provide utilities such as edit controls, combo boxes, radio buttons, check boxes, and push buttons, wherein the web publisher can use the various input devices (e.g., the mouse, the roller ball, the keypad, the keyboard, the pen and/or voice activation) in connection with the mechanism and utilities. For example, the web publisher can provide a location (e.g., the path) within a storage medium(s) via entering the path into an edit control and/or highlighting a check box associated with a valid path. Typically, a mechanism such as a push button is employed subsequent entering the information in order to initiate conveyance of the information. However, it is to be appreciated that the invention is not so limited. For example, merely highlighting the check box can initiate information conveyance.

In another example, a command line interface can be employed to present to and obtain information from the web publisher. For example, the command line interface can prompt (e.g., via a text message on a display and an audio tone) the web publisher for information via providing a text message. The web publisher can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The certificate generating component 320 (e.g., the certificate generating component 210), after receiving the request from the UI 310, can be employed to construct the self-signed web site certificate. In one aspect of the present invention, the certificate can be constructed with pre-populated server information (e.g., server identification). In addition, the certificate can be constructed with one or more common names. For example, common names such as an external domain name, local server name, and/or a local host name can be included to facilitate web browser access and web site certificate trusting.

After web site certificate construction, the certificate generating component 320 can convey the self-signed certificate to the certificate loading component 330. The certificate loading component 330 (e.g., the signature component 110) can then automatically install the self-signed certificate to the web site's server and automatically configure the certificate to employ SSL encryption. In addition, the certificate loading component 330 can automatically install the self-signed web site certificate to one or more web clients local to the web site's server in order to provide the local web client(s) with a trusted certificate. Automatically providing the trusted certificate to the web client(s) mitigates utilizing a manual technique to trust the certificate on the web client(s). Any local client can then access the web site without receiving an untrusted certificate warning and/or without employing a manual means to trust the self-signed certificate.

The certificate loading component 330 can additionally be employed to automatically install a signed certificate. For example, the website publisher can purchase a signed certificate for the web site. The web site publisher can then provide the signed certificate to the UI 310, which can convey the signed certificate to the certificate loading component 320. Similar to above, the certificate loading component 330 can automatically install the signed certificate to the web site's server and automatically configure the certificate to employ SSL encryption.

The certificate transforming component 340 can be employed to alter an existing certificate (e.g., signed and unsigned) during web site publishing. For example, the web publisher can create and/or purchase a certificate, and subsequently decide to change at least a portion of the certificate during publishing. The web publisher can indicate the desire to alter the certificate via the UI 310. In one aspect of the present invention, the web publisher can provide the certificate (e.g., the path to the certificate) and the modification via the UI 310. In another aspect of the present invention, the modification can be provided in a file. In yet another example, the modification can be provided in a second certificate, wherein the certificates can be merged and/or concatenated. The certificate transforming component 340 can then convey the altered certificate to the certificate loading component 320, wherein it can be automatically installed on the web site server and/or the local web clients, as described above.

Figure 4:
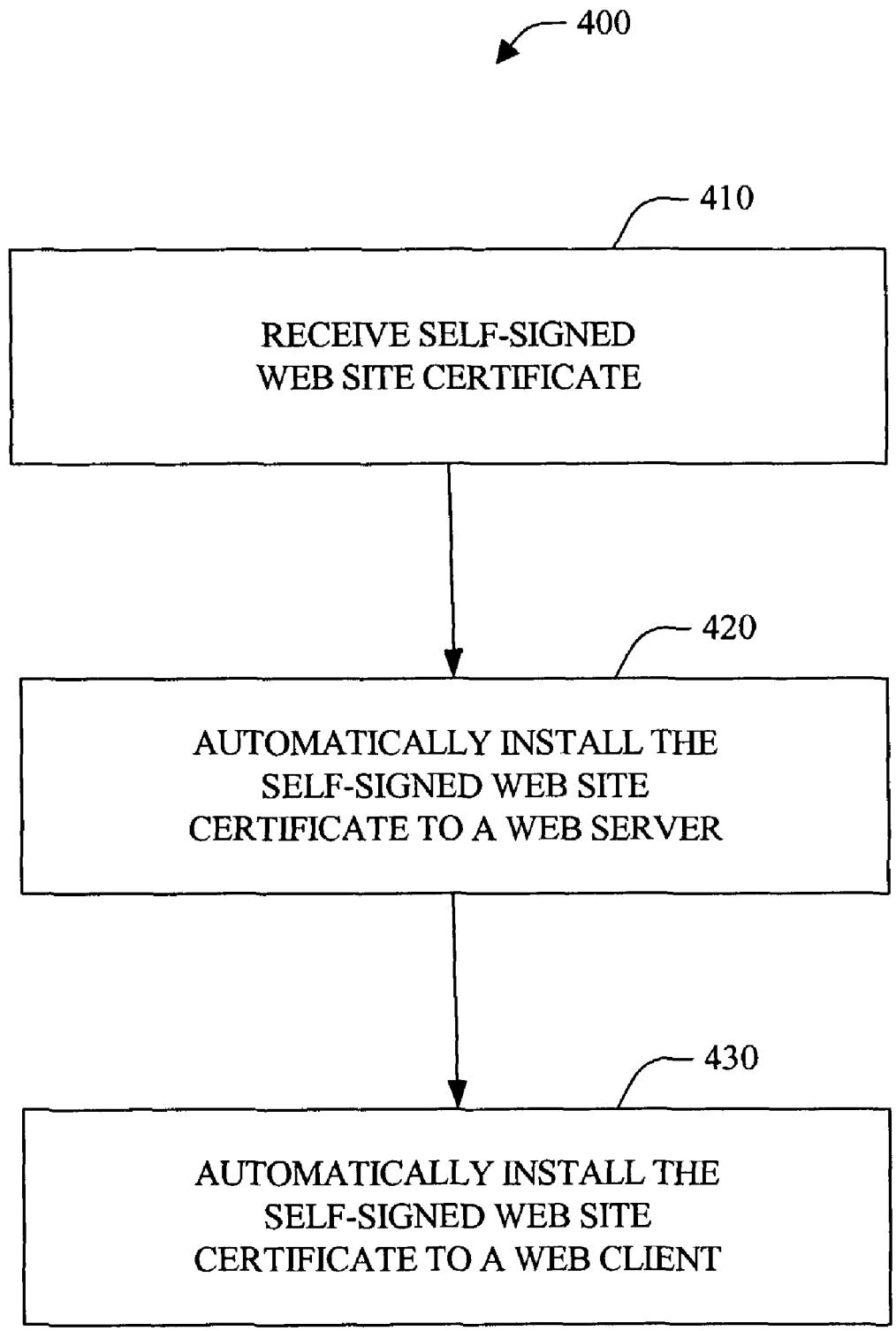
FIG. 4 illustrates an exemplary methodology to automatically trust a self-signed web site certificate on a domain web client, in accordance with an aspect of the present invention.
Figure 5:
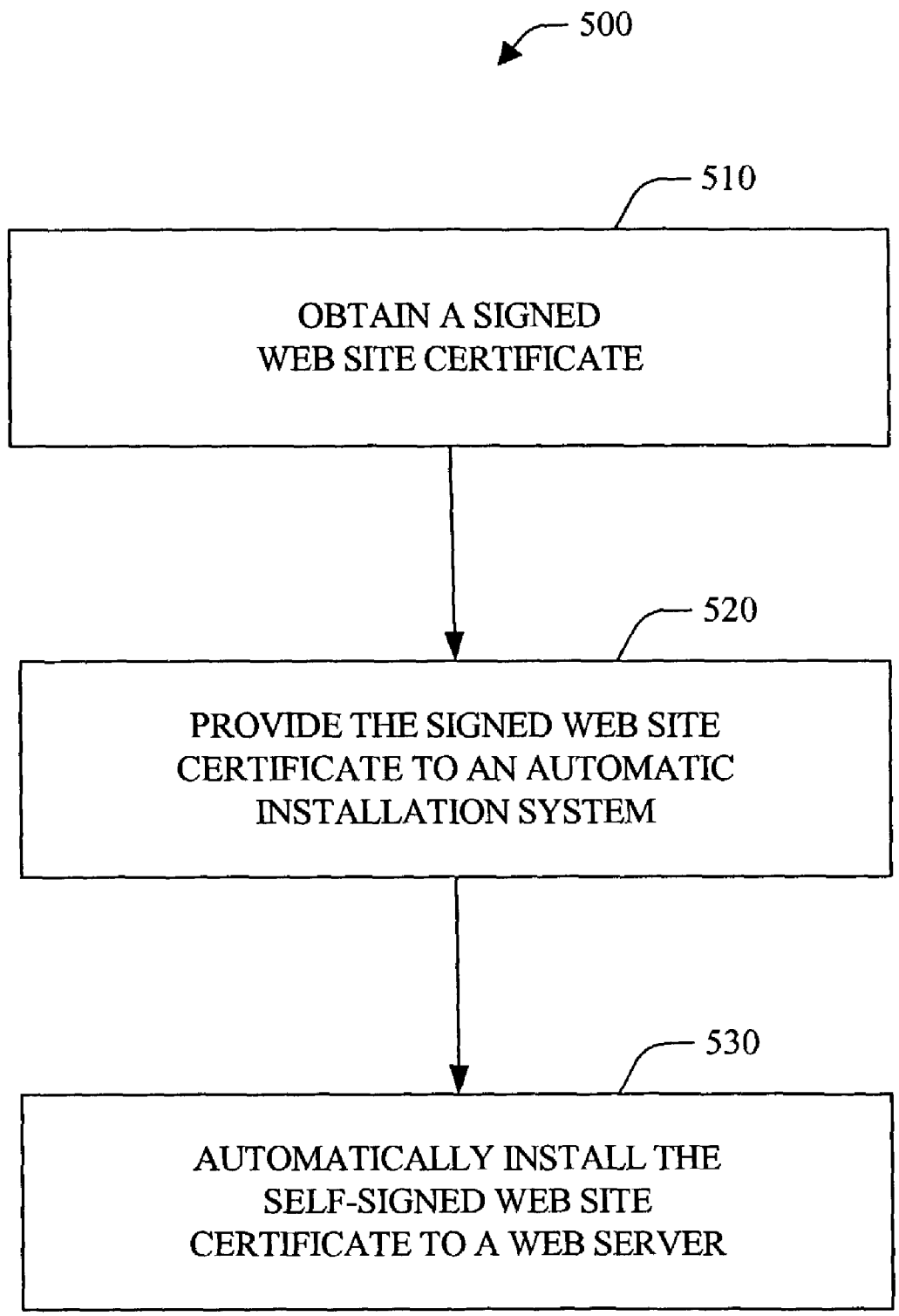
FIG. 5 illustrates an exemplary methodology to automatically install signed web site certificate on a web server, in accordance with an aspect of the present invention.
Figure 6:
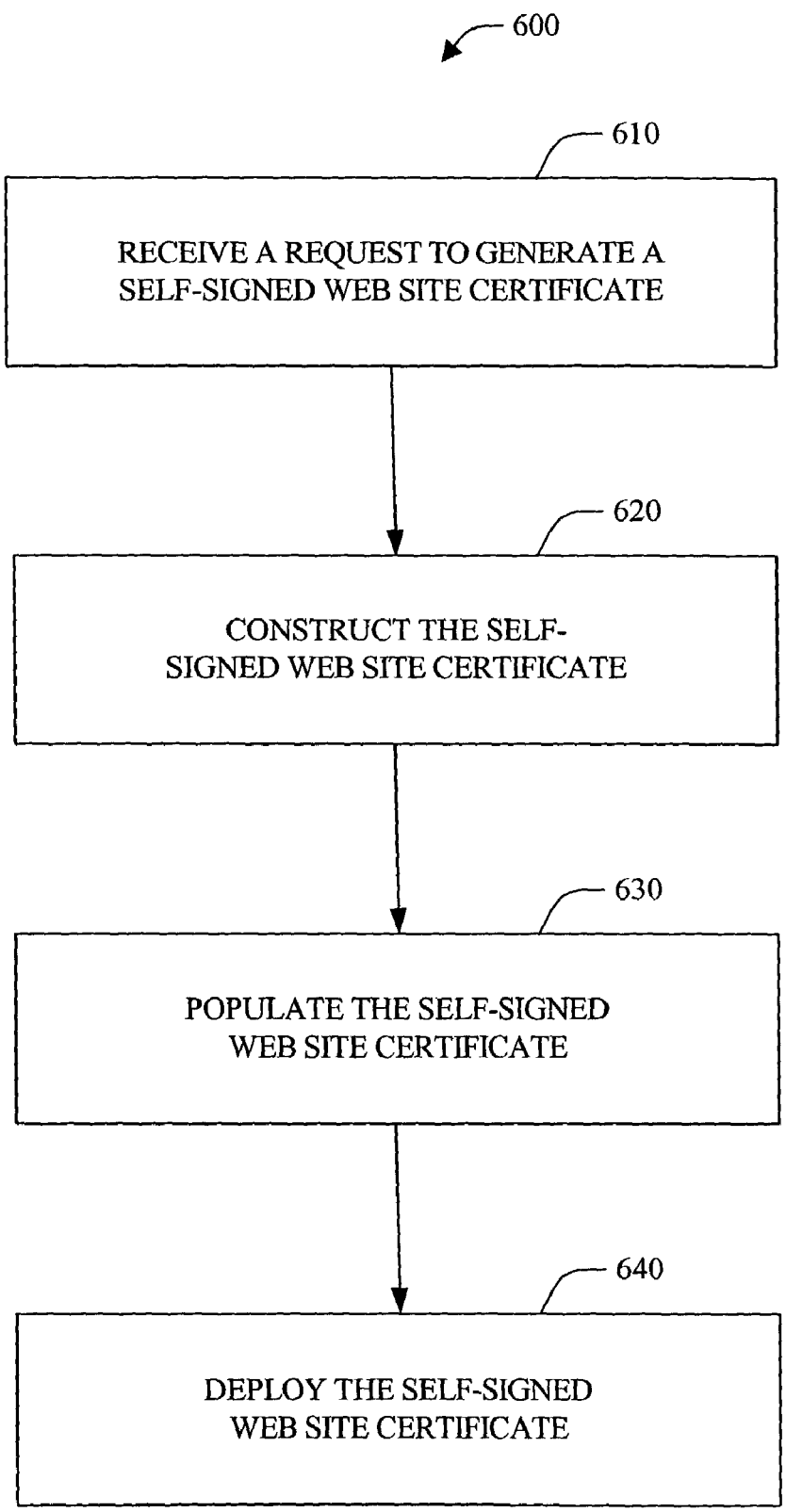
FIG. 6 illustrates an exemplary methodology to create a self-signed web site certificate, in accordance with an aspect of the present invention.

FIGS. 4-6 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement a methodology in accordance with the present invention. In addition, those skilled in the art will understand and appreciate that a methodology could alternatively be represented as a series of interrelated states (e.g., state diagram) or events.

Proceeding to FIG. 4, a methodology 400 to automatically trust a self-signed web site certificate on a domain web client, in accordance with an aspect of the present invention, is illustrated. At reference numeral 410, a self-signed web site certificate associated with a web site is received. As described above, a web publisher can create a self-signed web site certificate when publishing a web site, for example for Internet access by web clients. Next at reference numeral 420, the self-signed certificate can be automatically installed on a web server. In addition, SSL encryption can be automatically enabled. If SSL encryption is enabled, then it can be configured to provide SSL encryption in connection with portions of the web site that include sensitive information such as mobile access information, for example.

At reference numeral 430, the self-signed certificate can be automatically installed to a web client local to the network. For example, the self-signed web site certificate can be copied to a folder (e.g., secured and shared) and/or to a trusted root certificate store on the network web client. If the self-signed certificate is copied to the folder on the network web client, then the network web client can employ a mechanism to convey (e.g., move, transfer, install, load and copy) the self-signed web site certificate to its trusted root certificate store. Once saved to the network web client's trusted root certificate store, the network web client can access the web site without receiving an untrusted web site notification. The foregoing provides a novel approach to automatically trust a self-signed web site certificate on a network web client that mitigates manual trusting, which can be time consuming.

Next at FIG. 5, a methodology 500 to automatically install signed web site certificate on a web server, in accordance with an aspect of the present invention, is illustrated. At reference numeral 510, a signed website certificate associated with a web site is obtained. A signed certificate provides a means to securely (e.g., via SSL encryption) exchange information via a network (e.g., the Internet). At 520, the signed web site certificate can be employed with the systems and methods provided herein. For example, the signed web site certificate can be provided via the UI 310 to the signature component 120. Then at reference numeral 530, the signed certificate can be automatically installed on a web server, and the web server can be automatically configured to employ SSL encryption in connection with the web site.

Turning to FIG. 6, a methodology to create a self-signed web site certificate in accordance with an aspect of the present invention is illustrated. Proceeding to reference numeral 610, a request (e.g., via a UI, a command line and an API) is received to create a self-signed web site certificate for a web site. The request, for example, can be associated with a web site being published. The self-signed web site certificate can be employed to provide network security such a SSL encryption when transmitting and/or receiving information over the network. At 620, the self-signed web site certificate is constructed for the website. Typically, construction includes pre-populating the self-signed web site certificate with at least a server name.

At 630, one or more common names are included within the self-signed web site certificate. The one or more common names can provide various mechanisms for web browsers to access the web site, for example via external domain name, local server name and/or local host name. At 640, the constructed self-signed web site certificate is deployed in connection with an installation and/or a trusting mechanism in order to automatically install the self-signed web site certificate on a web server and a web client(s), and to automatically trust the self-signed web site certificate on a local network web client(s).

Figure 7:
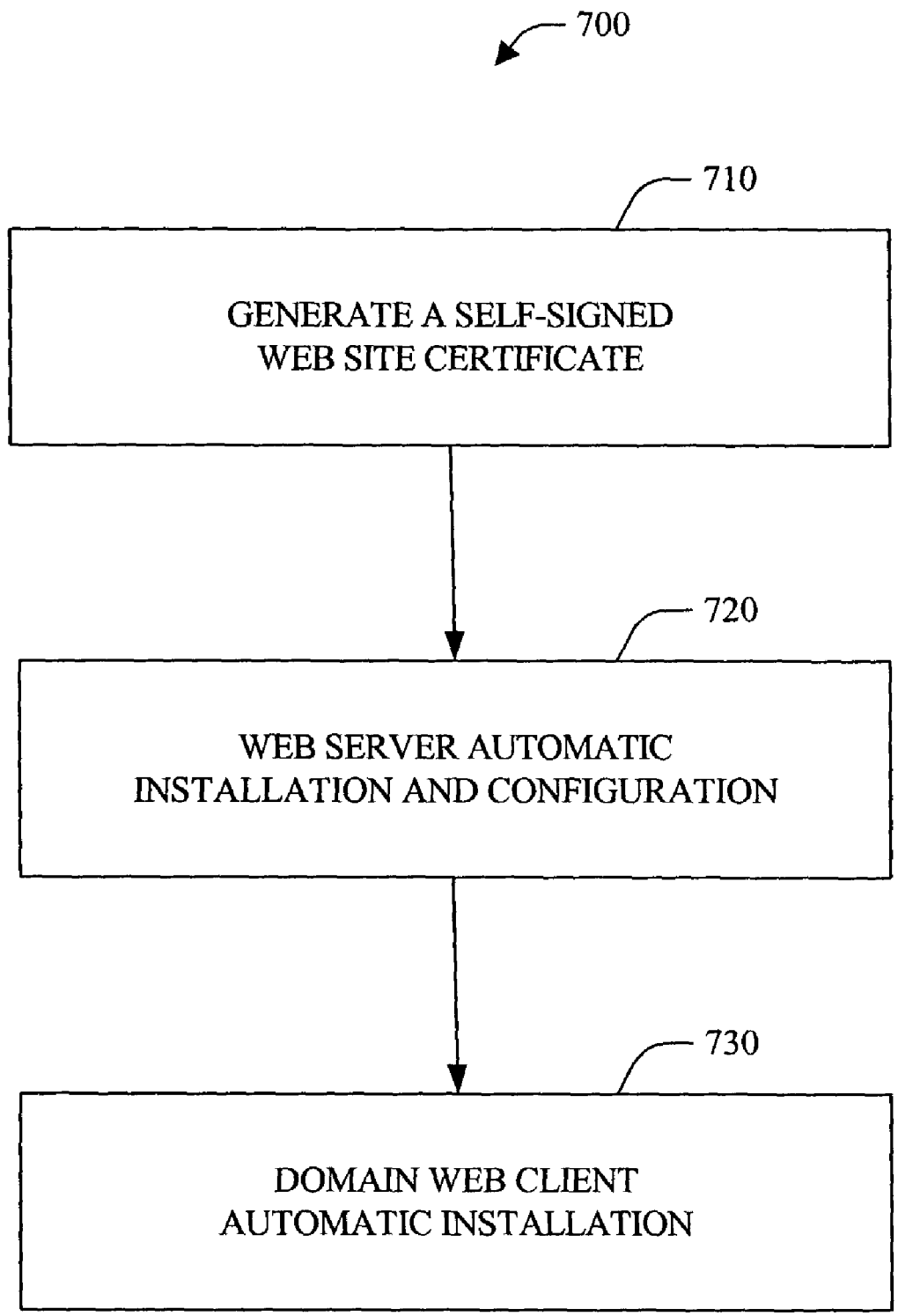
FIG. 7 illustrates an exemplary methodology to mitigate an attempt to redirect a web client to a factious web site when employing a self-signed web site certificate, in accordance with an aspect of the present.

Next at FIG. 7, a methodology 700 to mitigate a malicious attempt to redirect a web client to a factious web site when employing a self-signed web site certificate, in accordance with an aspect of the present invention, is illustrated.

Proceeding to 710, a self-signed web site certificate is generated in order to publish a web site for secure network access. It is to be appreciated that the self-signed web site certificate can be generated employing the mechanisms described herein. At 720, the self-signed web site certificate is automatically installed on a web server associated with the web site, and SSL encryption is automatically enabled.

At 730, the self-signed web site certificate is automatically installed on domain web clients. For example, in one aspect of the present invention, the self-signed web site certificate can be installed to a common and secure folder on the domain web client, wherein the domain web clients can move the self-signed web site certificate to a trusted root certificate store. In another aspect of the present invention, the self-signed web site certificate can be installed to the trusted root certificate store. Once saved to the domain web client's trusted root certificate store, the domain web client can access the web site without receiving an untrusted web site notification In general, and as noted above, a self-signed web site certificate is untrusted. When a web client accesses a web site employing a self-signed web site certificate, a message is typically provided to the user to notify the user that the web site is associated with an untrusted web site certificate. The user commonly has the option to manually trust the self-signed web site certificate. However, unless the user is familiar with the web site (e.g., the publisher), the user could trust a certificate to a fictitious web site. For example, a fictitious web site could employ an addressing scheme in order to redirect a user to the fictitious web site. The fictitious web site can be malicious and can include incorrect and/or inaccurate information, applications with viruses, applications to copy personal information, and fabricated services to attempt to solicit confidential information from a user, for example.

The present invention mitigates an attempt to redirect a user to a fictitious web site when employing a self-signed web site certificate from a local domain web client. In general, automatically installing and trusting the self-signed web site certificates on domain web client provides the web client with a trusted web site certificate. Thus, the web client can access the web site associated with the self-signed web site certificate without receiving any untrusted web site notification. However, if the web client is redirected to another web site, the domain web client will receive an untrusted web site notification. Therefore, the domain web client, and hence user, can be apprised of redirection via receiving the notification since the novel automatic trusting mechanism mitigates any need for a domain web client to trust an associate web site.

Figure 8:
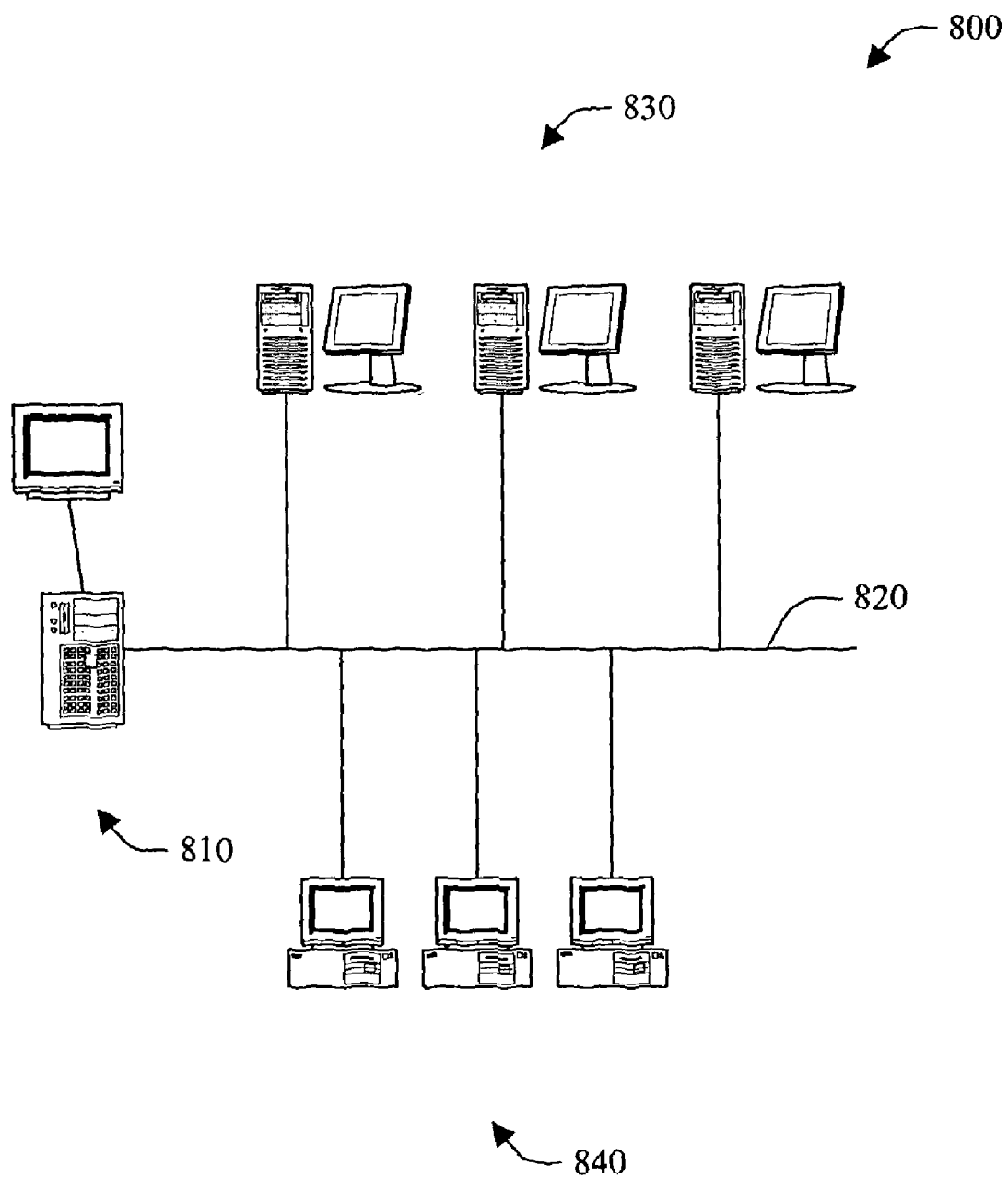
FIG. 8 illustrates an exemplary environment in accordance with one aspect of the present invention.

FIG. 8 illustrates an exemplary environment 800, wherein the novel aspects of the present invention can be employed. The environment 800 comprises a web server 810, a network 820, a plurality of domain clients 830, and one or more non-domain clients 840.

The web server 810 can be employed to store website information associated with web sites published on the Internet. For example, web site certificates can be stored on the web server 810 and employed from the web server 810. For example, a self-signed web site certificate and/or signed web site certificate can be automatically installed (e.g., as described above) in the web server in connection with publishing a web site in order to provide access to the web site, for example via a web client.

The network 820 can be employed to interface web clients in order to exchange information between at least two clients. The network 820 can be based on any known network topology. For example, the network 820 can be based on a bus topology (as depicted), a ring topology and/or a star topology. In addition, various protocols can be employed, including TCP/IP and IPX/SPX, for example. Furthermore, the transmission mechanism can employ various technologies such Infrared (IR), Ethernet (e.g., Gigabit), coaxial cable and Firewire, for example.

If a self-signed web site certificate is installed on the web server 810, then the self-signed web site certificate can additionally be installed on the plurality of domain web clients 830, wherein the installation technique can include a means to automatically provide a trusted web site certificate to the domain web clients 830. Then, when any one of the domain web clients 830 proceeds to access the web site, the web site certificate can be scrutinized and validated as trusted, and the domain web clients 830 can subsequently access the web site. When the one or more non-domain clients 840 attempt to access the web site, the web client will typically be provided with a notification indicating that the web site is untrusted.

Figure 9:
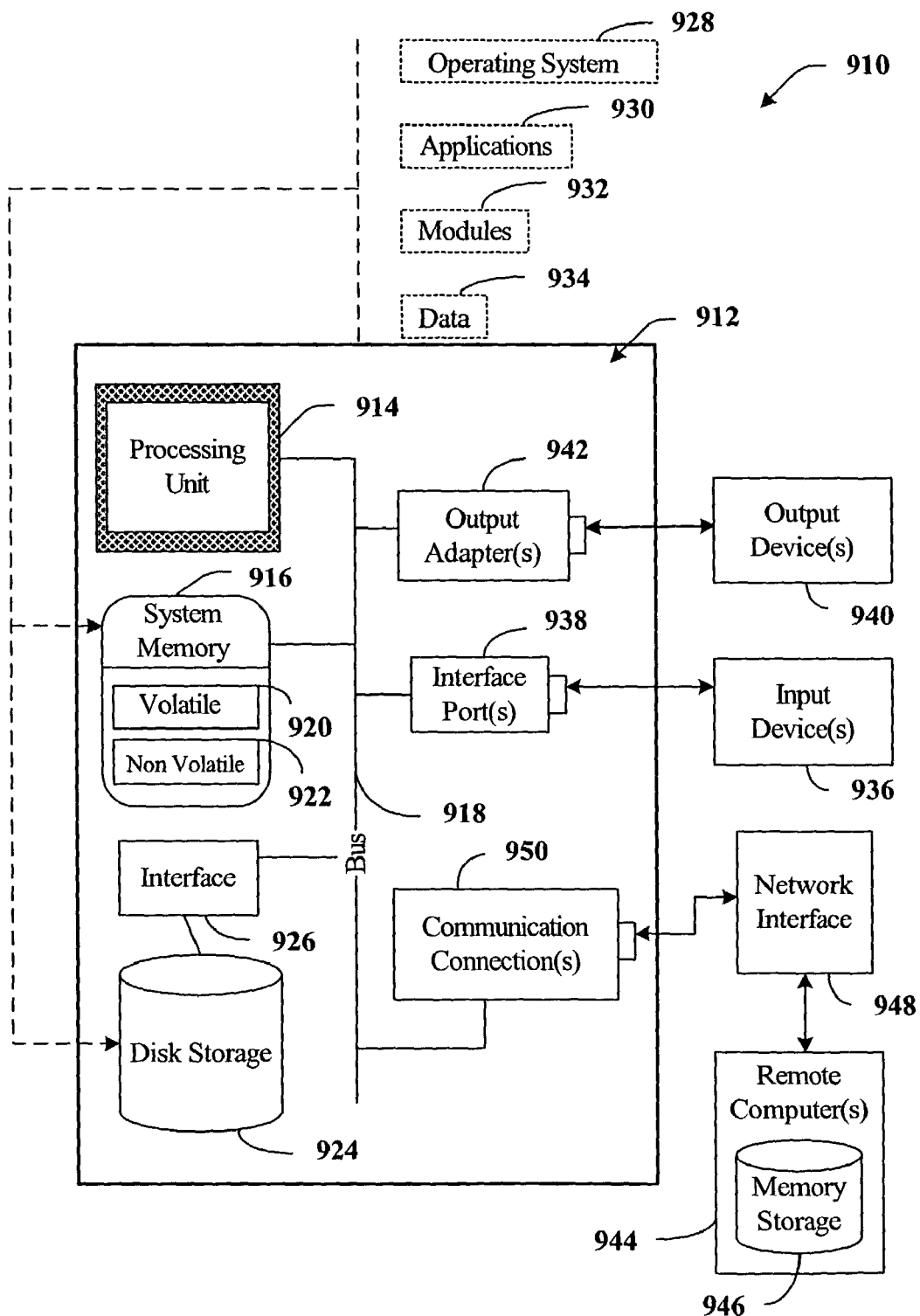
FIG. 9 illustrates an exemplary operating system in accordance with one aspect of the present invention.

In order to provide additional context for various aspects of the present invention, FIG. 9 and the following discussion are intended to provide a brief, general description of a suitable operating environment 910 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multi-processor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, an 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the term "includes" and variants thereof are used in the detailed description or the claims, these terms are intended to be inclusive in a manner similar to the term "comprising."

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system, as well as a computer-readable medium having computer-executable instructions for performing the acts and/or events of the various methods of the invention.

What is claimed is:

1. A computer implemented system that facilitates web site certificate installation on local domain web clients, comprising the following computer executable components stored on one or more computer readable media:

an input component that obtains a self-signed web site certificate and conveys the web site certificate to a signature component; and the signature component automatically installs the certificate on a web server and a domain web client local to the web server and mitigates appearance of an untrusted certificate warning to the web client by automatically trusting the self-signed website certificate on the web client.

2. The system of claim 1, further comprising a user interface that includes the input component.

3. The system of claim 2, the user interface comprising one of a wizard, an installation shell utility, and an API.

4. The system of claim 2, the user interface employed to interact with a web publisher to provide and/or create the self-signed web site certificate.

5. The system of claim 1, the web server comprising an Internet Information Server (IIS).

6. The system of claim 1, the signature component further employed to automatically configure the web server to employ an encryption mechanism.

7. The system of claim 6, the encryption mechanism comprising Secure Sockets Layer (SSL) encryption.

8. The system of claim 1, the signature component further employed to automatically configure the web client to employ an encryption mechanism.

9. The system of claim 8, the encryption mechanism comprising Secure Sockets Layer (SSL) encryption.

10. A computer executable system to automatically create, deploy and trust web site certificates, comprising the following computer executable components stored on computer readable media:

a certificate generating component to create and convey a self-signed web site certificate to a certificate loading component;

the certificate loading component automatically installs the self-signed web site certificate on a web server; and a certificate authenticating component that prevents an untrusted certificate warning to a domain web client local to the web server by automatically installing and trusting the self-signed web site certificate on the domain web client.

11. The system of claim 10, the self-signed web site certificate comprising an external domain name, local server name and a local host name associated with the web site.

12. The system of claim 10, the web server comprising an Internet Information Server (IIS).

13. The system of claim 10, the loading component further employed to automatically configure the web server to employ an encryption mechanism.

14. The system of claim 13, the encryption mechanism comprising Secure Sockets Layer (SSL) encryption.

15. The system of claim 13, the encryption mechanism configured to specifically require Secure Sockets Layer (SSL) encryption in connection with a portion of the web site.

16. The system of claim 10, the authenticating component further employed to automatically configure the domain web client to employ an encryption mechanism.

17. The system of claim 16, the encryption mechanism comprising Secure Sockets Layer (SSL) encryption.

18. A computer executable system to facilitate web site publishing, comprising the following computer executable components stored on computer readable media:
   a user interface component (UI) that receives a request to create a self-signed web site certificate;
   a certificate creating component that creates and conveys a self-signed web site certificate to a certificate loading component upon receiving the request to create a web site certificate; and
   the certificate loading component prevents the web clients from receiving a certificate warning by automatically installing and trusting the self-signed web site certificate on a web server and one or more of its domain web clients.

19. The system of claim 18, the UI comprising one of a graphical user interface (GUI), a command line interface, and an API.

20. The system of claim 19, the GUI comprising at least one of a dialogue box, a static control, a drop-down-menu, a list box, a pop-up menu, a graphic box, a vertical scroll bar, a horizontal scroll bar, an edit control, a combo box, a radio button, a check box, and a push button.

21. The system of claim 18, the UI employed in connection with at least one of a mouse, a roller ball, a keypad, a keyboard, a pen and voice activation.

22. The system of claim 18, the self-signed web site certificate comprising an external domain name, local server name and a local host name associated with the web site.

23. The system of claim 18, the web server comprising an Internet Information Server (IIS).

24. The system of claim 18, the loading component further employed to automatically configure the web server to employ an encryption mechanism.

25. The system of claim 24, the encryption mechanism comprising Secure Sockets Layer (SSL) encryption.

26. The system of claim 24, the encryption mechanism configured to specifically require Secure Sockets Layer (SSL) encryption in connection with a portion of the web site.

27. The system of claim 18, the authenticating component further employed to automatically configure the one or more domain web clients to employ an encryption mechanism.

28. The system of claim 27, the encryption mechanism comprising Secure Sockets Layer (SSL) encryption.

29. The system of claim 18, further comprising a component to alter the self-signed web site certificate by one of merging a modification into with the self-signed web site certificate and concatenating a modification with the self-signed web site certificate.

30. A method to automatically trust a self-signed web site certificate on a domain web client, comprising:
   generating and conveying a self-signed certificate associated with a web site upon receiving a request for the web site certificate;
   receiving the self-signed web site certificate;
   automatically installing the self-signed web site certificate on a web server; and
   preventing an appearance of a warning to a domain web client by automatically installing and trusting the self-signed web site certificate on the domain web client local to the web server.

31. The method of claim 30, further comprising automatically enabling SSL encryption on the web server and the web client.

32. The method of claim 30, further comprising installing the self-signed web site certificate into one of a folder on the domain web client and a trusted root certificate store on the domain web client.

33. The method of claim 32, the folder comprising a secured and shared folder.

34. The method of claim 32, the domain client employing a mechanism to copy the self-signed web site certificate from the folder to a trusted root certificate store.

35. The method of claim 30, the self-signed web site certificate comprising an external domain name, local server name and a local host name associated with the web site.

36. The method of claim 30, employed in connection with an API.

37. A method to automatically install signed web site certificate on a web server, comprising:
   generating and conveying a self-signed certificate associated with a web site to a certificate loading component upon receiving a request for the web site certificate;
   receiving a signed web site certificate associated with the web site;
   automatically installing the signed web site certificate on a web server; and
   automatically enabling SSL encryption on the web server; and
   facilitating warning-free navigation of a domain web client to the web site by automatically installing and trusting the self-signed web site certificate on domain web client local to the web server.

38. The system of claim 37, further comprising configuring the web server to specifically require SSL encryption in connection with a portion of the web site.

39. The method of claim 37, employed in connection with an API.

40. A method to facilitate secure communication between a domain web client and a web server employing a self-signed web site certificate, comprising:
   generating the self-signed web site certificate;
   automatically conveying and installing the self-signed web site certificate on a web server such that the web server can use the self-signed certificate to facilitate SSL encryption when serving web clients;
   automatically enabling SSL encryption on the web server;
   automatically installing and trusting the self-signed web site certificate on the domain web client such that the domain web client can use the self-signed certificate without a warning to facilitate SSL encryption when being served by the web server; and
   automatically enabling SSL encryption on the domain web client.

41. The method of claim 40, the self-signed certificate comprising at least one of an external domain name, local server name and a local host name.

42. A data packet transmitted between two or more computer components that facilitates installing and trusting self-signed web site certificates on a domain web client, comprising:
  a component to create and convey a self-signed web site certificate to an installation component, a component to automatically install the self-signed web site certificate on a web server and a domain web client, a component to automatically employ an encryption mechanism in connection with the web server and the domain web client, and a component to automatically trust the self-signed web site certificate on the domain web client.

43. A computer readable medium storing computer executable components to automatically install and trust self-signed certificates on a domain web client, comprising:
  a component to automatically transmit and install the self-signed certificate on a web server;
  a component to automatically enable an encryption mechanism on the web server;
  a component to automatically install the self-signed certificate on a domain web client;
  a component to automatically enable an encryption mechanism on the domain web client; and
  a component to prevent a warning to the web client by automatically trusting the self-signed certificate on the domain web client.

44. A system to automatically trust a self-signed web site certificate on a domain web client, comprising:
  means for obtaining the self-signed web site certificate generated by a web publisher;
  means for automatically installing the self-signed web site certificate to a web server and a trusted root certificate store on the domain web client hence preventing a warning when the web client navigates to the web site.

45. An API employed to generate, install and trust a self-signed web site certificate, comprising:
  constructing and conveying the self-signed web site certificate with at least a server name to a web server;
  automatically installing the self-signed web site certificate on the web server;
  automatically installing the self-signed web site certificate on a domain web client; and
  automatically trusting the self-signed web site certificate on the domain web client hence preventing a warning message to the web client when it accesses the web site.

46. The API of claim 45, further comprising pre-populating the self-signed certificate with an external domain name, a local server name and a local host name.

47. The API of claim 45, further comprising automatically enabling SSL encryption on the web server.

48. The API of claim 45, further comprising automatically enabling SSL encryption on the domain web client.

49. The API of claim 45, further comprising installing the self-signed web site certificate into one of a folder on the domain web client and a trusted root certificate store on the domain web client.

50. The API of claim 49, the folder comprising a secured and shared folder.

51. The API of claim 50, the domain web client employing a mechanism to copy the self-signed web site certificate from the folder to a trusted root certificate store.

52. A system to facilitate web site publishing, comprising:
  a user interface component (UI) that obtains a self-signed web site certificate generated and conveyed by a web publisher;
  a certificate transforming component that modifies the self-signed web site certificate, and a certificate loading component that mitigates appearance of a warning to a local domain web client by automatically installing and trusting the modified certificate on a web server and the domain web client.

53. The system of claim 1, the untrusted website certificate is generated by a web publisher.

* * * * *